US012604335B2

(12) United States Patent
Baek

(10) Patent No.: US 12,604,335 B2
(45) Date of Patent: Apr. 14, 2026

(54) METHOD AND APPARATUS FOR TRANSMISSION DATA SELECTION CONSIDERING SIMULTANEOUS CELL TRANSMISSION

(71) Applicant: Samsung Electronics Co., Ltd., Suwon-si (KR)

(72) Inventor: Sangkyu Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 300 days.

(21) Appl. No.: 18/022,370

(22) PCT Filed: Sep. 14, 2022

(86) PCT No.: PCT/KR2022/013710
§ 371 (c)(1),
(2) Date: Feb. 21, 2023

(87) PCT Pub. No.: WO2023/068560
PCT Pub. Date: Apr. 27, 2023

(65) Prior Publication Data
US 2024/0306183 A1 Sep. 12, 2024

(30) Foreign Application Priority Data

Oct. 20, 2021 (KR) ........................ 10-2021-0139950
Aug. 9, 2022 (KR) ........................ 10-2022-0099549

(51) Int. Cl.
*H04W 72/563* (2023.01)
*H04W 72/0446* (2023.01)
*H04W 72/21* (2023.01)

(52) U.S. Cl.
CPC ..... *H04W 72/563* (2023.01); *H04W 72/0446* (2013.01); *H04W 72/21* (2023.01)

(58) Field of Classification Search
CPC ........... H04W 72/563; H04W 72/0446; H04W 72/21; H04W 72/569; H04W 72/1268
See application file for complete search history.

(56) References Cited

U.S. PATENT DOCUMENTS

2013/0039231 A1* 2/2013 Wang .................... H04W 72/56
370/280
2015/0110029 A1* 4/2015 Hwang ................. H04L 1/1671
370/329
(Continued)

FOREIGN PATENT DOCUMENTS

WO 2021/162412 A1 8/2021

OTHER PUBLICATIONS

"3rd. Generation Partnership Project; Technical Specification Group Radio Access Network; NR; Medium Access Control (MAC) protocol specification (Release 16)", 3GPP Draft; 38321-G60, 3rd Generation Partnership Project (3GPP), Mobile Competence Centre ; 650, Route Des Lucioles ; F-06921 Sophia-Antipolis Cedex ; France.
MediaTek Inc., Methods for Intra-UE Multiplexing and Prioritization Document for: Discussion and Decision , 3GPP TSG RAN WG1 Meeting #106bis-e e-Meeting, Oct. 11-19, 2021, R1-2109577.
(Continued)

*Primary Examiner* — Christine Ng
(74) *Attorney, Agent, or Firm* — Jefferson IP Law, LLP

(57) ABSTRACT
The disclosure relates to a communication technique and a system for converging a 5G communication system with IoT technology to support a higher data rate after a 4G system. Based on 5G communication technology and IoT-related technologies, the disclosure can be applied to intelligent services (e.g., smart home, smart building, smart city, smart car or connected car, health care, digital education, retail, security and safety related services, etc.). The disclosure provides a method and apparatus for selecting data to be transmitted when data transmission occurs simultaneously in different cells.

12 Claims, 13 Drawing Sheets

(56)          References Cited

U.S. PATENT DOCUMENTS

| | | | |
|---|---|---|---|
| 2018/0324635 A1* | 11/2018 | Babaei | H04W 74/006 |
| 2020/0196327 A1 | 6/2020 | Zhang et al. | |
| 2021/0076405 A1* | 3/2021 | Li | H04L 5/0091 |
| 2021/0219300 A1* | 7/2021 | Lou | H04W 72/23 |
| 2021/0243779 A1* | 8/2021 | Takeda | H04L 1/1854 |
| 2021/0266953 A1* | 8/2021 | Pelletier | H04W 72/1268 |
| 2021/0315018 A1 | 10/2021 | Baek et al. | |
| 2022/0103304 A1* | 3/2022 | Elshafie | H04L 5/0094 |
| 2022/0353853 A1* | 11/2022 | Wu | H04L 1/1854 |
| 2023/0284214 A1* | 9/2023 | Yue | H04W 72/569 |
| | | | 370/329 |
| 2023/0397189 A1* | 12/2023 | Miao | H04W 72/1263 |

OTHER PUBLICATIONS

European Search Report dated Jan. 26, 2024, issued in European Application No. 22859454.5.

Qualcomm Incorporated; Intra-UE multiplexing and prioritization for IOT and URLLC; 3GPP TSG RAN WG1 #106bis-e; R1-2110181; Oct. 11-19, 2021; Oct. 2, 2021; e-Meeting.

LG Electronics; Discussion on Intra-UE multiplexing/prioritization; 3GPP TSG RAN WG1 #106bis-e; R1-2109973; Oct. 11-19, 2021; Oct. 2, 2021; e-Meeting.

Intel Corporation; Further details of intra-UE uplink channel multiplexing and prioritization; 3GPP TSG RAN WG1 #106bis-e; R1-2109607; Oct. 11-19, 2021; Oct. 2, 2021; e-Meeting.

viVO; Intra-UE Multiplexing/Prioritization for Rel-17 URLLC; 3GPP TSG RAN WG1 #106bis-e; R1-2108969; Oct. 11-19, 2021; Oct. 1, 2021; e-Meeting.

* cited by examiner

FIG. 5

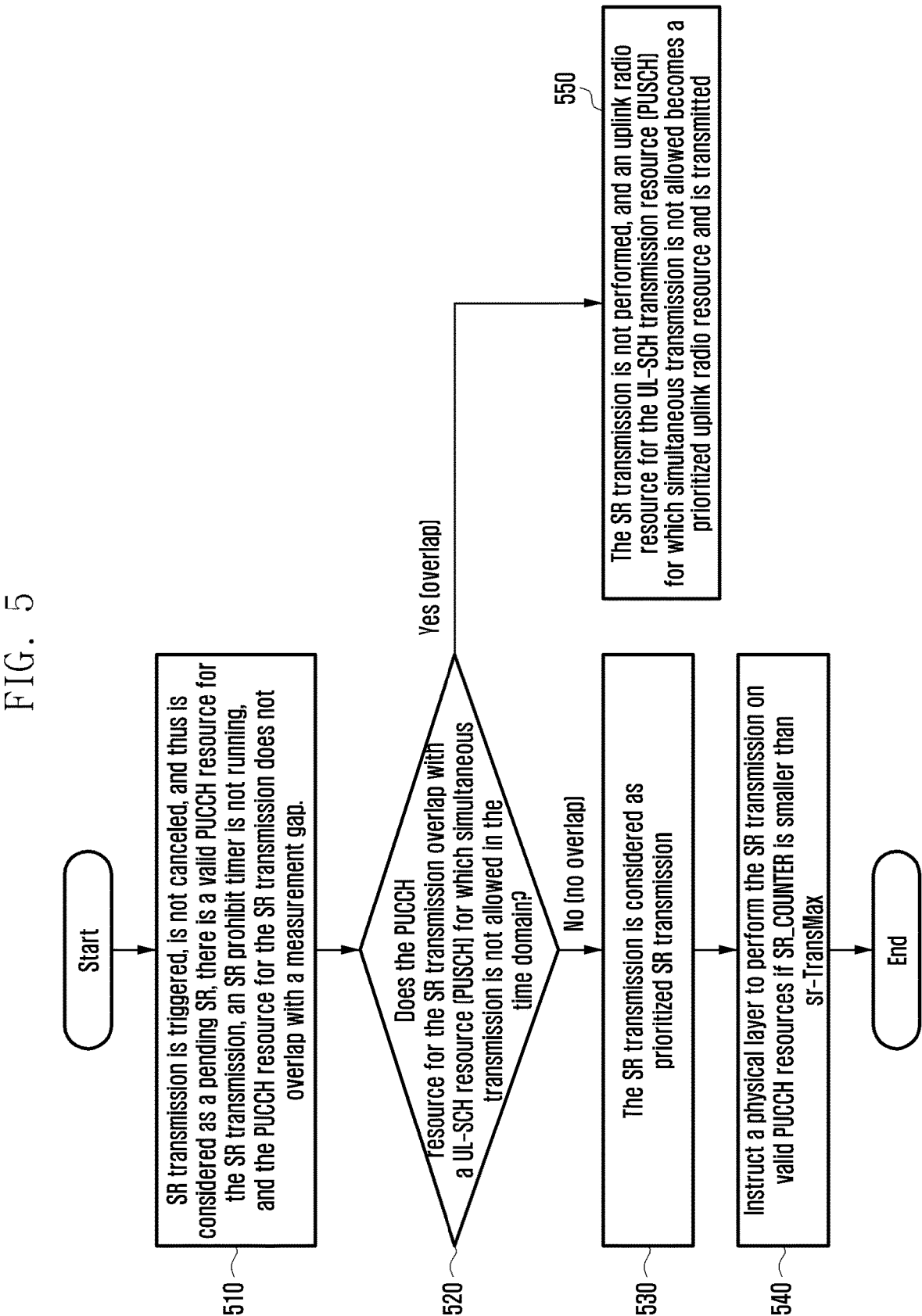

Start

510 — SR transmission is triggered, is not canceled, and thus is considered as a pending SR, there is a valid PUCCH resource for the SR transmission, an SR prohibit timer is not running, and the PUCCH resource for the SR transmission does not overlap with a measurement gap.

520 — Does the PUCCH resource for the SR transmission overlap with a UL-SCH resource (PUSCH) for which simultaneous transmission is not allowed in the time domain?

Yes [overlap]

550 — The SR transmission is not performed, and an uplink radio resource for the UL-SCH transmission resource (PUSCH) for which simultaneous transmission is not allowed becomes a prioritized uplink radio resource and is transmitted No [no overlap]

530 — The SR transmission is considered as prioritized SR transmission

540 — Instruct a physical layer to perform the SR transmission on valid PUCCH resources if SR_COUNTER is smaller than sr-TransMax End 1210          1220          1230

Transceiver    Base station    Storage
               controller

METHOD AND APPARATUS FOR TRANSMISSION DATA SELECTION CONSIDERING SIMULTANEOUS CELL TRANSMISSION

TECHNICAL FIELD

The disclosure relates to a method and apparatus for selecting data to be transmitted when data transmission occurs simultaneously in different cells.

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post long term evolution (LTE) System'. The 5G communication system is considered to be implemented in extremely high frequency (mmWave) bands (e.g., 60 GHz band) so as to accomplish higher data rates. To decrease propagation loss of the radio waves and increase the transmission distance, the beamforming, massive multiple-input multiple-output (massive MIMO), full dimensional MIMO (FD-MIMO), array antenna, an analog beamforming, large scale antenna techniques, etc. have been discussed and adopted in the 5G communication system. In addition, in the 5G communication systems, development for system network improvement is under way based on an advanced small cell, a cloud radio access network (cloud RAN), an ultra-dense network, device-to-device (D2D) communication, wireless backhaul, moving network, cooperative communication, coordinated multi-points (COMP), reception-end interference cancellation, and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as sensing technology, wired/wireless communication and network infrastructure, service interface technology, and security technology have been required for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. The IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (cloud RAN) as the above-described big data processing technology may also be considered to be as an example of convergence between the 5G technology and the IoT technology.

Meanwhile, even if PUCCH transmission and PUSCH transmission are configured and occur in different cells in a situation of carrier aggregation (CA) of a plurality of cells, it may be difficult to perform simultaneous transmission due to limitations in PUCCH transmit power or the like.

DISCLOSURE OF INVENTION

Technical Problem

The disclosure is to provide a method for performing data transmission in the case where PUCCH transmission and PUSCH transmission in different cells overlap with each other on the time axis.

Solution to Problem

According to an embodiment of the disclosure, a method of a terminal in a wireless communication system may include, in a medium access control (MAC) entity configured with a logical channel (LCH)-based prioritization operation, identifying a first uplink resource related to data transmittable by a lower layer of the MAC entity; checking whether a transmission time interval of the first uplink resource overlaps with a transmission time interval of a second uplink resource that has a higher priority than a priority of the first uplink resource and is not de-prioritized; and determining the first uplink resource as a prioritized uplink resource when the transmission time interval of the first uplink resource does not overlap with the transmission time interval of the second uplink resource, wherein the second uplink resource may be not allowed, by configuration, simultaneous transmission of a physical uplink shared channel (PUSCH) and a physical uplink control channel (PUCCH) with the first uplink resource.

In addition, according to an embodiment of the disclosure, a terminal in a wireless communication system may include a transceiver; and a controller identifying, in a medium access control (MAC) entity configured with a logical channel (LCH)-based prioritization operation, a first uplink resource related to data transmittable by a lower layer of the MAC entity, checking whether a transmission time interval of the first uplink resource overlaps with a transmission time interval of a second uplink resource that has a higher priority than a priority of the first uplink resource and is not de-prioritized, and determining the first uplink resource as a prioritized uplink resource when the transmission time interval of the first uplink resource does not overlap with the transmission time interval of the second uplink resource, wherein the second uplink resource may be not allowed, by configuration, simultaneous transmission of a physical uplink shared channel (PUSCH) and a physical uplink control channel (PUCCH) with the first uplink resource.

Advantageous Effects of Invention

According to an embodiment of the disclosure, there are effects that when PUCCH transmission and PUSCH transmission occur at the same time in different cells, it is possible to determine whether to perform simultaneous transmission, and if simultaneous transmission cannot be performed, it is possible to determine which transmission is to be performed first.

BRIEF DESCRIPTION OF DRAWINGS

FIG. 5 is a diagram illustrating an SR triggering operation considering a PUCCH-PUSCH simultaneous transmission condition according to an embodiment of the disclosure.

MODE FOR THE INVENTION

In describing the disclosure hereinafter, a detailed description of related known configurations or functions will be omitted when it is determined that the detailed description thereof may unnecessarily obscure the subject matter of the disclosure. Hereinafter, embodiments of the disclosure will be described with reference to the accompanying drawings.

Figure 1:
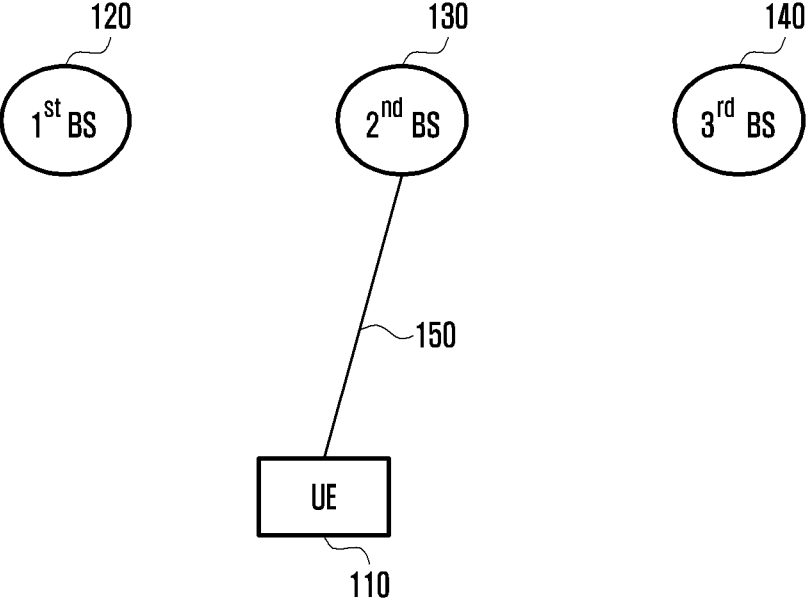
FIG. 1 is a diagram illustrating a connection scheme between a UE and a base station in a mobile communication system according to an embodiment of the disclosure.

FIG. 1 is a diagram illustrating a connection scheme between a UE and a base station in a mobile communication system according to an embodiment of the disclosure.

A user equipment (UE) 110, which is one component in the mobile communication system, is a communication device possessed by a user using a communication service, and is capable of performing wireless communication through connection with one or more base stations 120, 130, and 140. The embodiment of FIG. 1 shows an example in which the UE is located in the coverage of the second base station 130 and has a radio resource control (RRC) connection 150 with the second base station.

In the mobile communication system, a UE may move to the coverage of another base station due to its mobility, and in this case, a process of changing a connection to another base station is called handover. The frequency band used by the base station may be a licensed band that a communication service provider leases and uses a frequency, or an unlicensed band that can be used without permission. In the case of wireless communication in the unlicensed band, a listen before talk (LBT) operation should be performed for coexistence with other communication systems or other services using radio waves. In addition, transmission for wireless communication may collide with other communication systems or other services using radio waves, and in this case, successful transmission may not be made. A wireless communication protocol in the unlicensed band should be designed in consideration of such characteristics of the unlicensed band.

The 5th-generation (5G) mobile communication system considers ultra-reliable and low-latency communications (URLLC) communication having strict service requirements as a major scenario, and various technologies are required for the URLLC communication. In this case, a plurality of cells may be simultaneously configured and used with carrier aggregation technology in a medium access control (MAC) device used for connection between the UE and the base station. However, although the transmission of a physical uplink control channel (PUCCH) for control signal transmission of a physical channel and the transmission of a physical uplink shared channel (PUSCH) are configured in different cells, it may be difficult to perform simultaneous transmission due to limitations in PUCCH transmit power or the like. Such simultaneous transmission of PUCCH and PUSCH may be possible only under specific conditions, for example, in the case where the transmit power capable of performing simultaneous transmission of PUCCH and PUSCH is sufficient and the physical layer priorities (PHY Priority) of PUCCH and PUSCH transmissions are different. The PUCCH transmission may include a scheduling request (SR) message, a hybrid automatic repeat request (HARQ) feedback, a channel state indicator (CSI) report message, and the like.

Figure 2:
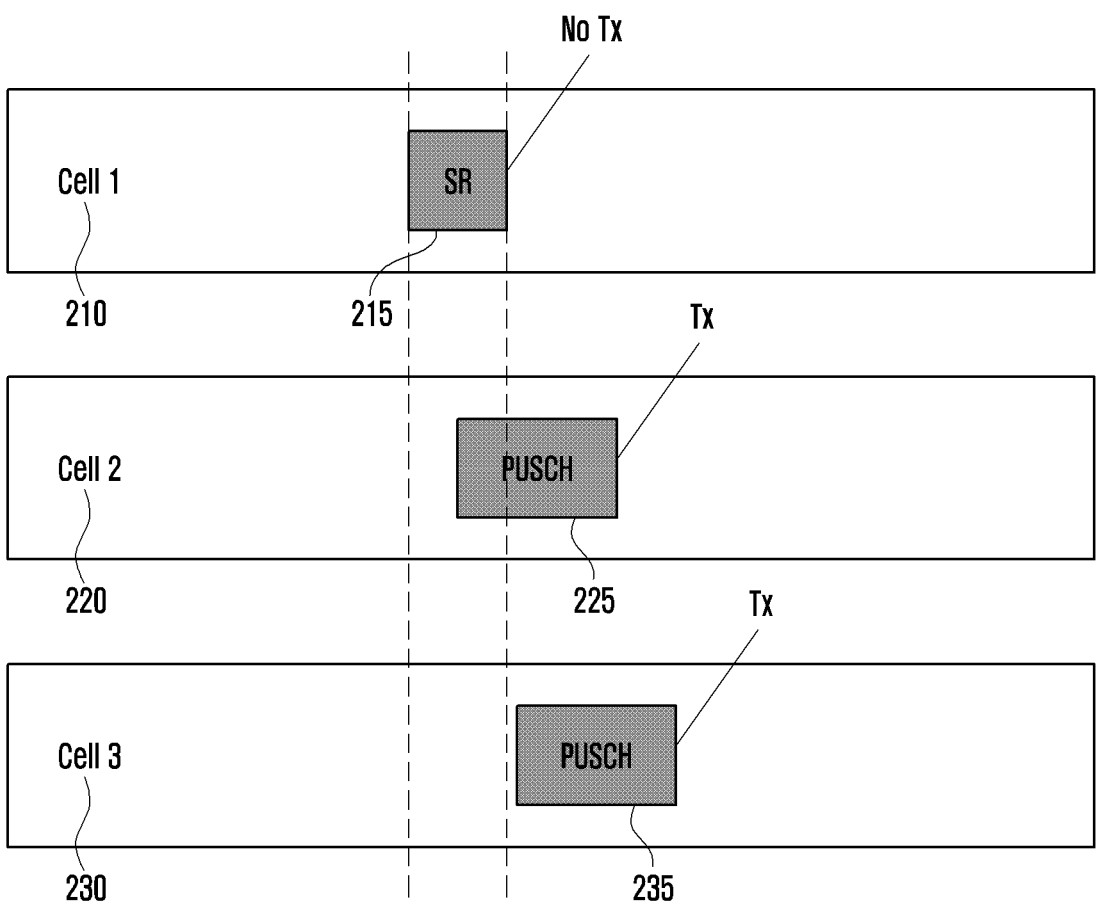
FIG. 2 is a diagram illustrating a typical SR triggering operation in accordance with PUCCH-PUSCH simultaneous transmission prohibition.

FIG. 2 is a diagram illustrating a typical SR triggering operation in accordance with PUCCH-PUSCH simultaneous transmission prohibition.

A plurality of cells may be simultaneously configured and used with carrier aggregation technology in a MAC device used for connection between a UE and a base station. However, although the transmission of a physical uplink control channel (PUCCH) for control signal transmission of a physical channel and the transmission of a physical uplink shared channel (PUSCH) are configured in different cells, it may be difficult to perform simultaneous transmission due to limitations in PUCCH transmit power or the like.

In the example of FIG. 2, it is assumed that three cells, a first cell 210, a second cell 220, and a third cell 230, are simultaneously configured with carrier aggregation in the MAC device. In the first cell, SR transmission 215 using a PUCCH resource occurs, and this SR transmission 215 overlaps with transmission 225 of an uplink shared channel (UL-SCH) using a PUSCH resource in the second cell on the time axis. The UL-SCH transmission may have a one-to-one correspondence with transmission of a medium access control protocol data unit (MAC PDU). UL-SCH transmission 235 using a PUSCH resource occurs in the third cell as well, but the UL-SCH transmission 235 can be performed independently in the third cell because it does not overlap with the SR transmission 215 on the time axis. Besides, the PUSCH transmission can also be performed independently of the UL-SCH transmission 225 of the second cell because it is performed independently of PUSCH transmission of other cells.

Because the SR transmission 215 occurring in the first cell overlaps with the UL-SCH transmission 225 using a PUSCH resource of the second cell on the time axis, only the UL-SCH transmission 225 of the second cell is performed and the SR transmission 215 is not performed. The occurring SR transmission is considered as prioritized SR transmission when there is no PUSCH resource for UL-SCH transmission overlapping on the time axis in the MAC device, and it may be instructed to perform SR transmission to a physical layer, which is a lower layer. The operation of FIG. 2 may be caused by an operation in which transmission using a PUSCH resource has priority when a PUCCH resource and a PUSCH resource occur simultaneously in the case where a logical channel (LCH)-based prioritization operation is not configured.

Figure 3:
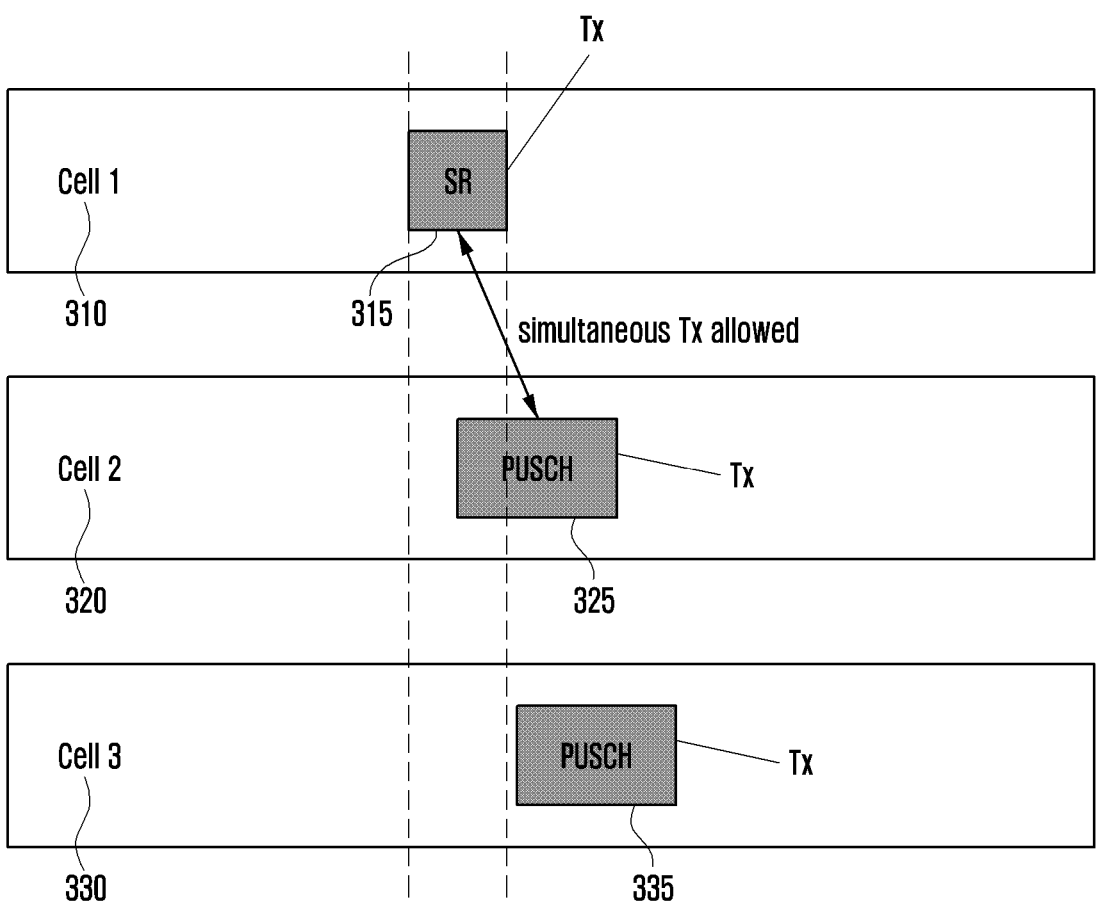
FIG. 3 is a diagram illustrating an SR triggering operation considering a PUCCH-PUSCH simultaneous transmission condition according to an embodiment of the disclosure.

FIG. 3 is a diagram illustrating an SR triggering operation considering a PUCCH-PUSCH simultaneous transmission condition according to an embodiment of the disclosure.

A plurality of cells may be simultaneously configured and used with carrier aggregation technology in a MAC device used for connection between a UE and a base station. However, although the transmission of a physical uplink control channel (PUCCH) for control signal transmission of a physical channel and the transmission of a physical uplink shared channel (PUSCH) are configured in different cells, it may be difficult to perform simultaneous transmission due to limitations in PUCCH transmit power or the like. However, if transmission using PUCCH a resource and transmission using a PUSCH resource are possible at the same time, and if simultaneous transmission is necessary, the PUCCH resource and the PUSCH resource may be simultaneously used and transmitted.

In the embodiment of FIG. 3, it is assumed that three cells, a first cell 310, a second cell 320, and a third cell 330, are simultaneously configured with carrier aggregation in the MAC device. In the first cell, SR transmission 315 using a PUSCH resource occurs, and this SR transmission 315 overlaps with transmission 325 of an uplink shared channel (UL-SCH) using a PUSCH resource in the second cell on the time axis. The UL-SCH transmission may have a one-to-one correspondence with transmission of a medium access control protocol data unit (MAC PDU). Further, it is assumed that the SR transmission 315 occurring in the first cell can be performed simultaneously with the transmission 325 using a PUSCH resource and occurring in the second cell. UL-SCH transmission 335 using a PUSCH resource occurs in the third cell as well, but the UL-SCH transmission 335 can be performed independently in the third cell because it does not overlap with the SR transmission 315 on the time axis. Besides, the PUSCH transmission can also be performed independently of the UL-SCH transmission 325 of the second cell because it is performed independently of PUSCH transmission of other cells.

Because the SR transmission 315 generated in the first cell overlaps with the UL-SCH transmission 325 using a PUSCH resource of the second cell on the time axis, but simultaneous transmission is possible, the SR transmission 315 in the first cell is considered as prioritized SR transmission, and it may be indicated to perform SR transmission to a physical layer, which is a lower layer. In addition, the UL-SCH transmission 325 of the second cell is also performed, an uplink radio resource (uplink grant) to be transmitted through the UL-SCH is considered as a prioritized uplink radio resource (prioritized uplink grant), and it may be instructed to perform transmission using this uplink radio resource to a physical layer, which is a lower layer.

The operation of FIG. 3 may be caused by an operation in which transmission using a PUSCH resource has priority when a PUCCH resource and a PUSCH resource, which are not allowed for simultaneous transmission, occur simultaneously (overlapping on the time axis) in the case where a logical channel (LCH)-based prioritization operation is not configured. When simultaneous transmission of a PUCCH resource and a PUSCH resource occurs simultaneously (overlapping on the time axis) as in the embodiment of FIG. 3, the SR transmission and the UL-SCH resource transmission may be performed respectively.

Figure 4:
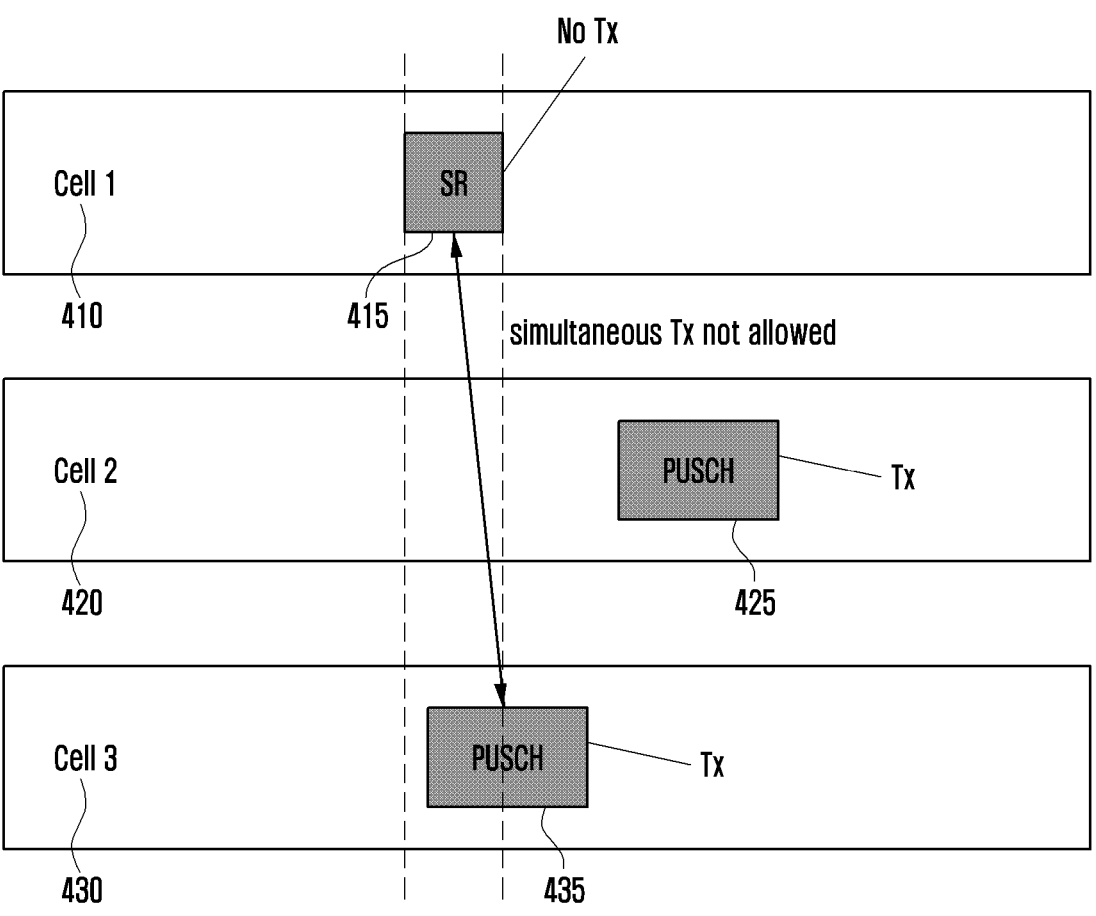
FIG. 4 is a diagram illustrating an SR triggering operation considering a PUCCH-PUSCH simultaneous transmission condition according to an embodiment of the disclosure.

FIG. 4 is a diagram illustrating an SR triggering operation considering a PUCCH-PUSCH simultaneous transmission condition according to an embodiment of the disclosure.

A plurality of cells may be simultaneously configured and used with carrier aggregation technology in a MAC device used for connection between a UE and a base station. However, although the transmission of a physical uplink control channel (PUCCH) for control signal transmission of a physical channel and the transmission of a physical uplink shared channel (PUSCH) are configured in different cells, it may be difficult to perform simultaneous transmission due to limitations in PUCCH transmit power or the like. However, if transmission using PUCCH a resource and transmission using a PUSCH resource are possible at the same time, and if simultaneous transmission is necessary, the PUCCH resource and the PUSCH resource may be simultaneously used and transmitted.

In the embodiment of FIG. 4, it is assumed that three cells, a first cell 410, a second cell 420, and a third cell 430, are simultaneously configured with carrier aggregation in the MAC device. In the first cell, SR transmission 415 using a PUCCH resource occurs, and this SR transmission 415 overlaps with transmission 435 of an uplink shared channel (UL-SCH) using a PUSCH resource in the third cell on the time axis. The UL-SCH transmission may have a one-to-one correspondence with transmission of a medium access control protocol data unit (MAC PDU). Further, it is assumed that the SR transmission 415 occurring in the first cell cannot be performed simultaneously with the transmission 435 using a PUSCH resource and occurring in the third cell. UL-SCH transmission 425 using a PUSCH resource occurs in the second cell as well, but the UL-SCH transmission 425 can be performed independently in the second cell because it does not overlap with the SR transmission 415 on the time axis. Besides, the PUSCH transmission can also be performed independently of the UL-SCH transmission 435 of the third cell because it is performed independently of PUSCH transmission of other cells.

Because the SR transmission 415 occurring in the first cell overlaps with the UL-SCH transmission 435 using a PUSCH resource of the third cell on the time axis, but simultaneous transmission is not possible, the SR transmission 415 in the first cell is not considered as prioritized SR transmission, and it cannot be indicated to perform SR transmission to a physical layer, which is a lower layer. Therefore, the SR transmission 415 is not transmitted on this PUCCH resource. In addition, the UL-SCH transmission 435 of the third cell is performed, an uplink radio resource (uplink grant) to be transmitted through the UL-SCH is considered as a prioritized uplink radio resource (prioritized uplink grant), and it may be instructed to perform transmission using this uplink radio resource to a physical layer, which is a lower layer.

The operation of FIG. 4 may be caused by an operation in which transmission using a PUSCH resource has priority when a PUCCH resource and a PUSCH resource, which are not allowed for simultaneous transmission, occur simultaneously (overlapping on the time axis) in the case where a logical channel (LCH)-based prioritization operation is not configured. When simultaneous transmission of a PUCCH resource and a PUSCH resource occurs simultaneously (overlapping on the time axis), the SR transmission and the UL-SCH resource transmission may be performed respectively.

FIG. 5 is a diagram illustrating an SR triggering operation considering a PUCCH-PUSCH simultaneous transmission condition according to an embodiment of the disclosure.

The embodiment of FIG. 5 indicates an operation of considering whether there is a UL-SCH resource using a PUSCH resource not allowed for simultaneous transmission, when SR transmission using the PUCCH resource is performed in the case where a logical channel (LCH)-based prioritization operation is not configured. If the SR transmission is triggered, is not canceled, and thus is considered as a pending SR, it is assumed that there is a valid PUCCH resource for the SR transmission, an SR prohibit timer is not running, and the PUCCH resource for the SR transmission does not overlap with a measurement gap, at step 510.

If this condition is satisfied, there is a possibility of performing the SR transmission, and an operation of identifying whether the SR transmission can be transmitted may be required. In this case, at step 520, it may be identified whether the PUCCH resource for the SR transmission overlaps with the UL-SCH resource not allowed for simultaneous transmission (i.e., PUSCH resource) in the time domain. At the step 520, an operation of identifying the allocation state of the UL-SCH resource not allowed for simultaneous transmission is required, and an operation of identifying the allocation state of the UL-SCH resource enabling simultaneous transmission may not be required. For example, an operation allowed for simultaneous transmission using the PUCCH resource for transmitting SR and the UL-SCH resource (PUSCH) resource may be enabled when there are different PHY priorities within the same PUCCH group. In another embodiment, an operation allowed for simultaneous transmission may be enabled in the case of a cell of the PUSCH resource configured to be allowed for simultaneous transmission with a cell of the PUCCH resource. Alternatively, an operation allowed for simultaneous transmission may be enabled in the case where transmit power for transmission of the PUCCH resource and transmission of the PUSCH resource is sufficient.

If the PUCCH resource for the SR transmission does not overlap with the UL-SCH transmission resource for which simultaneous transmission is not allowed in the time domain at the step 520, the SR transmission using this PUCCH resource can be performed. Therefore, at step 530, the SR transmission may be considered as prioritized SR transmission. In addition, if SR COUNTER is smaller than sr-TransMax, instruct the physical layer to perform the SR transmission on valid PUCCH resources at step 540. If the PUCCH resource for the SR transmission overlaps with the UL-SCH transmission resource for which simultaneous transmission is not allowed in the time domain at the step 520, the SR transmission using this PUCCH resource cannot be performed. Therefore, at step 550, this SR transmission is not performed. Further, an uplink radio resource for the UL-SCH transmission resource (PUSCH) not allowed for simultaneous transmission may become a prioritized uplink radio resource and be transmitted.

Figure 6:
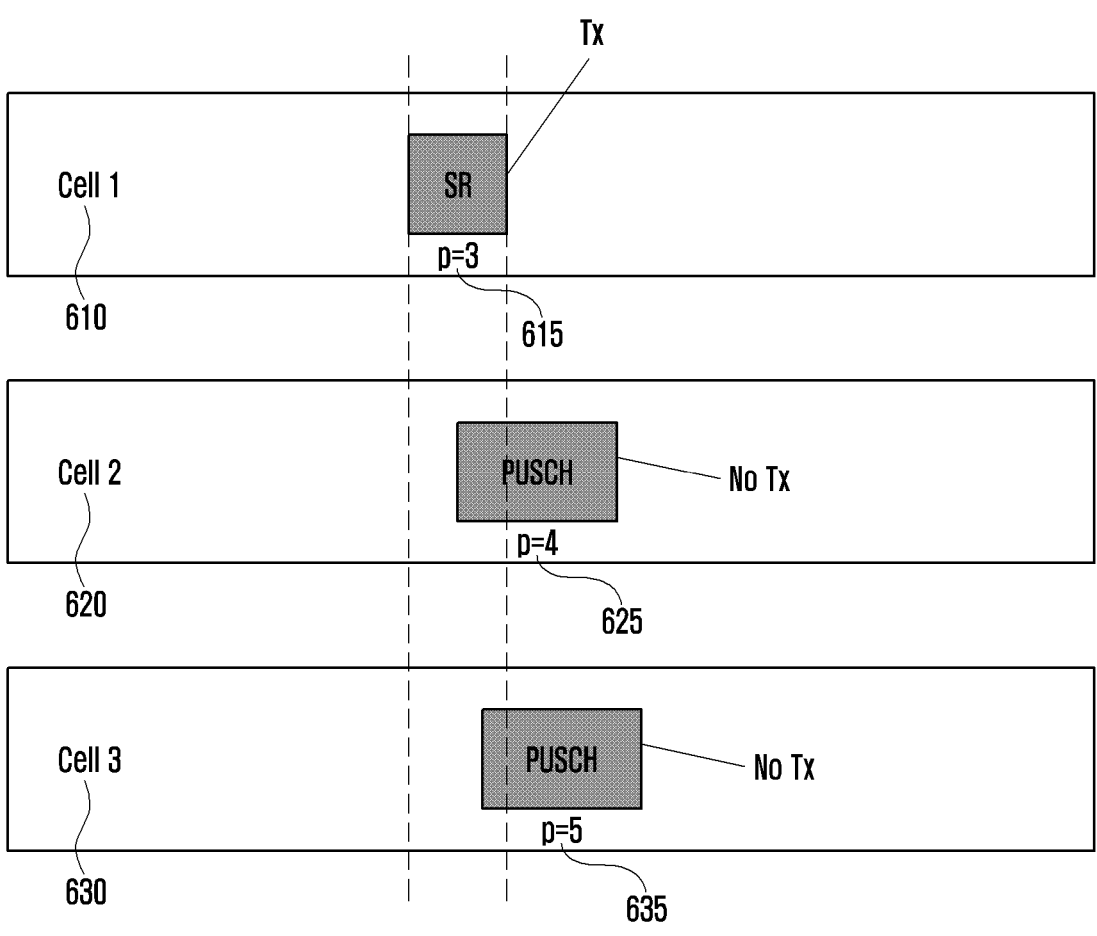
FIG. 6 is a diagram illustrating a typical SR triggering operation in accordance with PUCCH-PUSCH simultaneous transmission prohibition.

FIG. 6 is a diagram illustrating a typical SR triggering operation in accordance with PUCCH-PUSCH simultaneous transmission prohibition.

A plurality of cells may be simultaneously configured and used with carrier aggregation technology in a MAC device used for connection between a UE and a base station. However, although the transmission of a physical uplink control channel (PUCCH) for control signal transmission of a physical channel and the transmission of a physical uplink shared channel (PUSCH) are configured in different cells, it may be difficult to perform simultaneous transmission due to limitations in PUCCH transmit power or the like.

In the example of FIG. 6, it is assumed that three cells, a first cell 610, a second cell 620, and a third cell 630, are simultaneously configured with carrier aggregation in the MAC device. In the first cell, SR transmission 615 using a PUCCH resource occurs, and this SR transmission 615 overlaps with transmission 625 of an uplink shared channel (UL-SCH) using a PUSCH resource in the second cell and transmission 635 of a UL-SCH using a PUSCH resource in the third cell on the time axis. The UL-SCH transmission may have a one-to-one correspondence with transmission of a medium access control protocol data unit (MAC PDU). In the case where a logical channel (LCH)-based prioritization operation is configured, and if the PUCCH resource for the SR transmission overlaps with other PUSCH transmission resource in the MAC device, it is possible to compare logical channel priorities and perform only transmission having a higher priority. Specifically, by comparing the logical channel priority (LCH priority) of the logical channel (LCH) that triggers the SR and the priority of the uplink radio resource (uplink grant) to be transmitted as the UL-SCH resource (PUSCH resource) overlapping with the PUCCH resource of this SR on the time axis, only transmission using a resource with a higher priority can be performed. In this case, the priority of the logical channel triggering the SR may be referred to as the priority of this SR transmission.

The priority of an uplink radio resource may be determined as the highest priority among the priorities of data that can be contained in a MAC PDU to be transmitted using this uplink radio resource (if the MAC PDU to be transmitted is not stored in an HARQ buffer) or as the highest priority among the priorities of data contained in the MAC PDU (if the MAC PDU to be transmitted is stored in the HARQ buffer). The priority value may be expressed as a number value, and a small number value indicates a high priority.

In the embodiment of FIG. 6, the priority of SR transmission occurring in the first cell is 3 (615), the priority of an uplink radio resource using a PUSCH resource occurring in the second cell is 4 (625), and the priority of an uplink radio resource using a PUSCH resource occurring in the third cell is 5 (635). In this case, because the priority of SR transmission is higher than those of PUSCH transmissions overlapping on other time axes, this SR transmission may be selected as a prioritized SR transmission and transmitted. Also, other uplink radio resources overlapping on the time axis become de-prioritized uplink radio resources (also referred to as de-prioritized uplink grants or non-prioritized uplink radio resources) and may not be transmitted. In this case, if SR transmission using a PUCCH resource and transmission of an uplink radio resource using a PUSCH resource can be simultaneously performed, it is necessary to perform simultaneous transmission in consideration of this during a logical channel-based prioritization operation.

Figure 7:
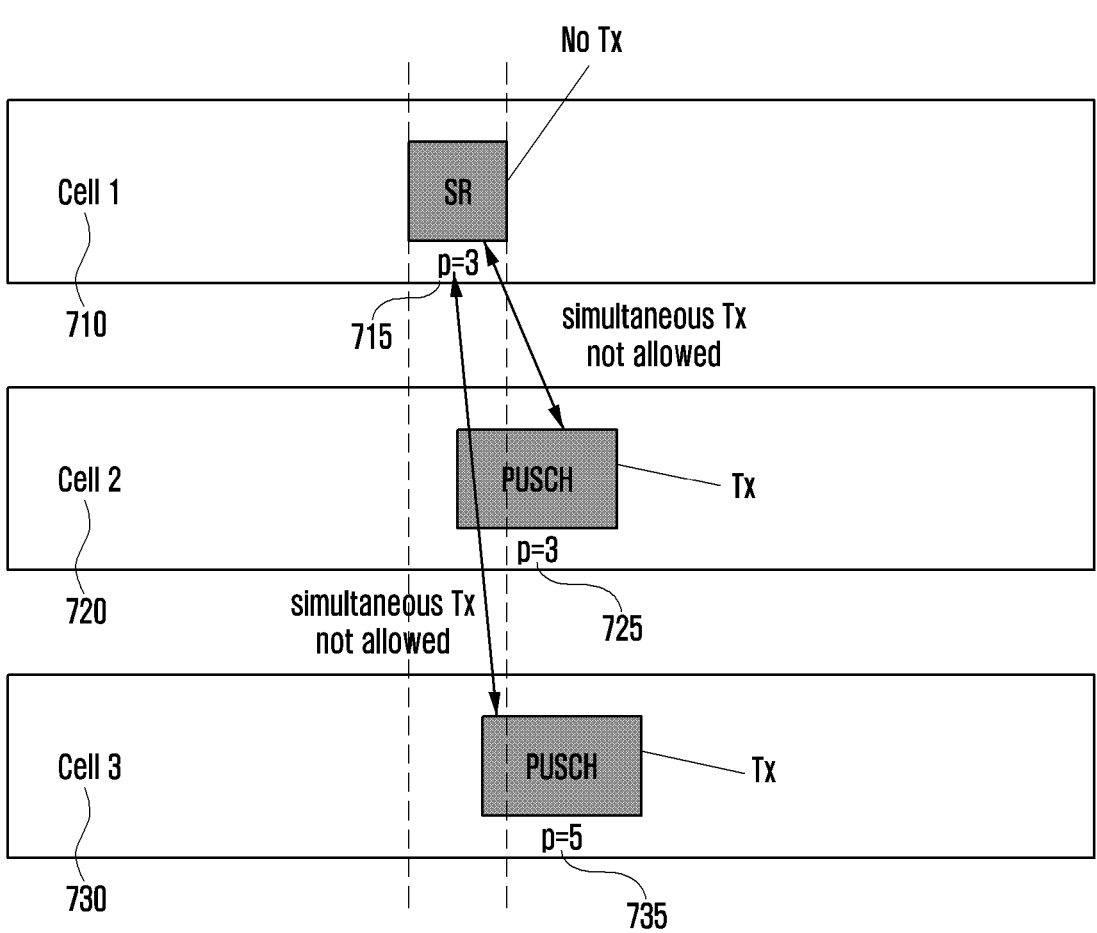
FIG. 7 is a diagram illustrating an SR triggering operation considering a PUCCH-PUSCH simultaneous transmission condition according to an embodiment of the disclosure.

FIG. 7 is a diagram illustrating an SR triggering operation considering a PUCCH-PUSCH simultaneous transmission condition according to an embodiment of the disclosure.

A plurality of cells may be simultaneously configured and used with carrier aggregation technology in a MAC device used for connection between a UE and a base station. However, although the transmission of a physical uplink control channel (PUCCH) for control signal transmission of a physical channel and the transmission of a physical uplink shared channel (PUSCH) are configured in different cells, it may be difficult to perform simultaneous transmission due to limitations in PUCCH transmit power or the like. However, if transmission using PUCCH a resource and transmission using a PUSCH resource are possible at the same time, and if simultaneous transmission is necessary, the PUCCH resource and the PUSCH resource may be simultaneously used and transmitted.

In the example of FIG. 7, it is assumed that three cells, a first cell 710, a second cell 720, and a third cell 730, are simultaneously configured with carrier aggregation in the MAC device. In the first cell, SR transmission 715 using a PUCCH resource occurs, and this SR transmission 715 overlaps with transmission 725 of an uplink shared channel (UL-SCH) using a PUSCH resource in the second cell and transmission 735 of a UL-SCH using a PUSCH resource in the third cell on the time axis. The UL-SCH transmission may have a one-to-one correspondence with transmission of a medium access control protocol data unit (MAC PDU). In the case where a logical channel (LCH)-based prioritization operation is configured, and if the PUCCH resource for the SR transmission overlaps with other PUSCH transmission resource not allowed for simultaneous transmission in the MAC device, it is possible to compare logical channel priorities and perform only transmission having a higher priority.

Specifically, by comparing the logical channel priority (LCH priority) of the logical channel (LCH) that triggers the SR and the priority of the uplink radio resource (uplink grant) to be transmitted as the UL-SCH resource (PUSCH resource) that is not allowed for simultaneous transmission and overlaps with the PUCCH resource of this SR on the time axis, only transmission using a resource with a higher priority can be performed. If the PUCCH resource for SR transmission allowing simultaneous transmission and the UL-SCH resource (PUSCH) overlap on the time axis, both resources may be simultaneously transmitted. In this case, the priority of an uplink radio resource may be determined as the highest priority among the priorities of data that can be contained in a MAC PDU to be transmitted using this uplink radio resource (if the MAC PDU to be transmitted is not stored in an HARQ buffer) or as the highest priority among the priorities of data contained in the MAC PDU (if the MAC PDU to be transmitted is stored in the HARQ buffer). The priority value may be expressed as a number value, and a small number value indicates a high priority.

In the embodiment of FIG. 7, the priority of SR transmission occurring in the first cell is 3 (715), the priority of an uplink radio resource using a PUSCH resource occurring in the second cell is 3 (725), and the priority of an uplink radio resource using a PUSCH resource occurring in the third cell is 5 (735). It is assumed that simultaneous transmission is not allowed between the transmission 715 of a PUCCH resource for SR transmission in the first cell and the transmission 725 of an uplink radio resource using a PUSCH resource in the second cell. Also, it is assumed that simultaneous transmission is not allowed between the transmission 715 of a PUCCH resource for SR transmission of the first cell and the transmission 735 of an uplink radio resource using a PUSCH resource of the third cell. In this case, because the priority of SR transmission is higher than that of PUSCH transmission in the third cell, which overlaps on the time axis, but it is the same as the priority of PUSCH transmission in the second cell, uplink radio resource transmission of the same priority takes precedence, and the SR transmission 715 cannot be performed. In this case, the SR transmission 715 may be a de-prioritized SR transmission. The uplink radio resource of the second cell has the same priority as the SR transmission 715, but it becomes a prioritized uplink radio resource (prioritized uplink grant) and can be transmitted. The uplink radio resource 735 for the PUSCH resource of the third cell is not de-prioritized because it has already been determined that the SR transmission 715 overlapping on the time axis will not be transmitted, and can be transmitted because there is no PUCCH resource of the SR transmission 715 overlapping on the time axis.

Figure 8:
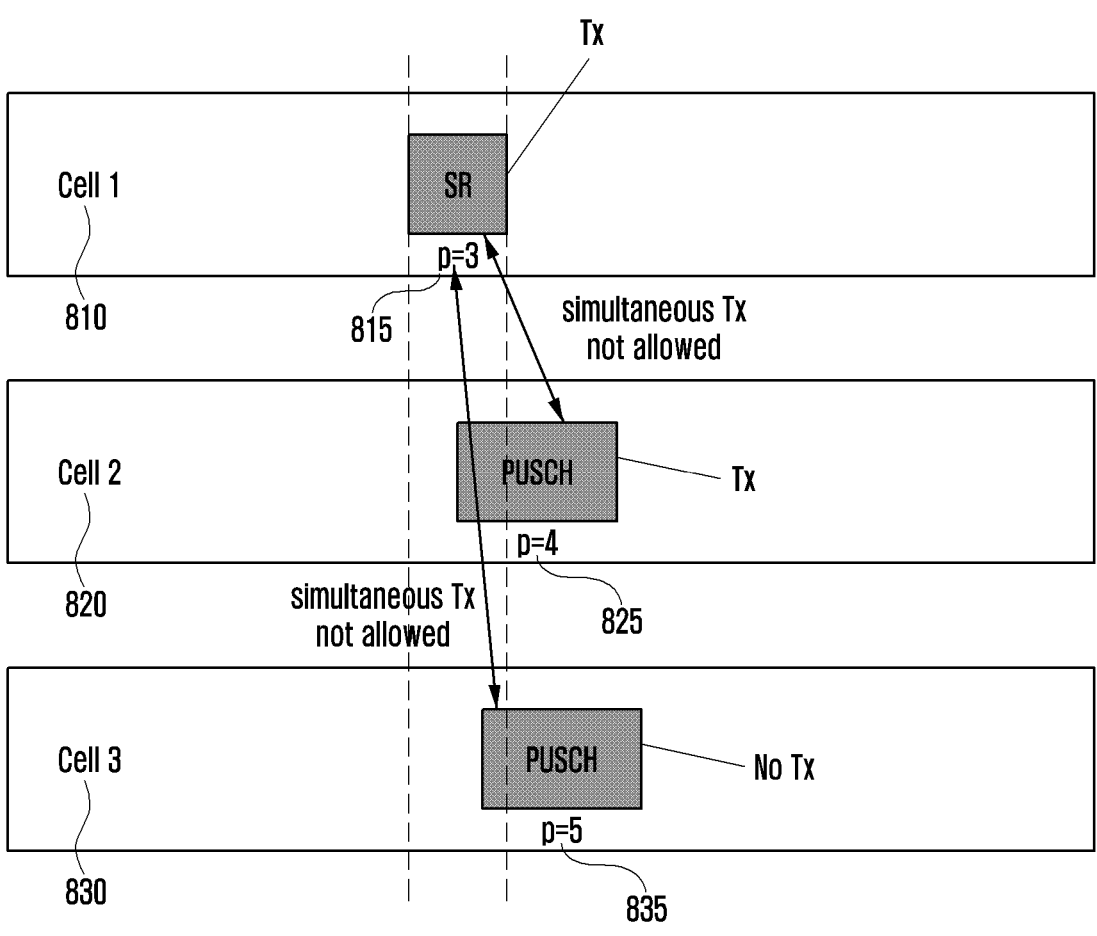
FIG. 8 is a diagram illustrating an SR triggering operation considering a PUCCH-PUSCH simultaneous transmission condition according to an embodiment of the disclosure.

FIG. 8 is a diagram illustrating an SR triggering operation considering a PUCCH-PUSCH simultaneous transmission condition according to an embodiment of the disclosure.

A plurality of cells may be simultaneously configured and used with carrier aggregation technology in a MAC device used for connection between a UE and a base station. However, although the transmission of a physical uplink control channel (PUCCH) for control signal transmission of a physical channel and the transmission of a physical uplink shared channel (PUSCH) are configured in different cells, it may be difficult to perform simultaneous transmission due to limitations in PUCCH transmit power or the like. However, if transmission using PUCCH a resource and transmission using a PUSCH resource are possible at the same time, and if simultaneous transmission is necessary, the PUCCH resource and the PUSCH resource may be simultaneously used and transmitted.

In the example of FIG. 8, it is assumed that three cells, a first cell 810, a second cell 820, and a third cell 830, are simultaneously configured with carrier aggregation in the MAC device. In the first cell, SR transmission 815 using a PUCCH resource occurs, and this SR transmission 815 overlaps with transmission 825 of an uplink shared channel (UL-SCH) using a PUSCH resource in the second cell and transmission 835 of a UL-SCH using a PUSCH resource in the third cell on the time axis. The UL-SCH transmission may have a one-to-one correspondence with transmission of a medium access control protocol data unit (MAC PDU). In the case where a logical channel (LCH)-based prioritization operation is configured, and if the PUCCH resource for the SR transmission overlaps with other PUSCH transmission resource not allowed for simultaneous transmission in the MAC device, it is possible to compare logical channel priorities and perform only transmission having a higher priority.

Specifically, by comparing the logical channel priority (LCH priority) of the logical channel (LCH) that triggers the SR and the priority of the uplink radio resource (uplink grant) to be transmitted as the UL-SCH resource (PUSCH resource) that is not allowed for simultaneous transmission and overlaps with the PUCCH resource of this SR on the time axis, only transmission using a resource with a higher priority can be performed. If the PUCCH resource for SR transmission allowing simultaneous transmission and the UL-SCH resource (PUSCH) overlap on the time axis, both resources may be simultaneously transmitted. In this case, the priority of an uplink radio resource may be determined as the highest priority among the priorities of data that can be contained in a MAC PDU to be transmitted using this uplink radio resource (if the MAC PDU to be transmitted is not stored in an HARQ buffer) or as the highest priority among the priorities of data contained in the MAC PDU (if the MAC PDU to be transmitted is stored in the HARQ buffer). The priority value may be expressed as a number value, and a small number value indicates a high priority.

In the embodiment of FIG. 8, the priority of SR trans- mission occurring in the first cell is 3 (815), the priority of an uplink radio resource using a PUSCH resource occurring in the second cell is 4 (825), and the priority of an uplink radio resource using a PUSCH resource occurring in the third cell is 5 (835). It is assumed that simultaneous trans- mission is allowed between the transmission 815 of a PUCCH resource for SR transmission in the first cell and the transmission 825 of an uplink radio resource using a PUSCH resource in the second cell. Also, it is assumed that simul- taneous transmission is not allowed between the transmis- sion 815 of a PUCCH resource for SR transmission of the first cell and the transmission 835 of an uplink radio resource using a PUSCH resource of the third cell. In this case, because the priority of the logical channel triggering the SR transmission is higher than that of the PUSCH transmission of the third cell overlapping on the time axis, this SR transmission 815 becomes a prioritized SR transmission and can be transmitted. Although the priority of the logical channel triggering the SR transmission is lower than that of the PUSCH transmission in the second cell, the transmission of the PUSCH resource in the second cell may be excluded from a procedure of checking whether to perform SR transmission because it is allowed to be transmitted simul- taneously with this SR transmission. Therefore, the uplink radio resource 825 using the PUSCH resource of the second cell becomes a prioritized uplink radio resource (prioritized uplink grant) and can be transmitted.

Figure 9:
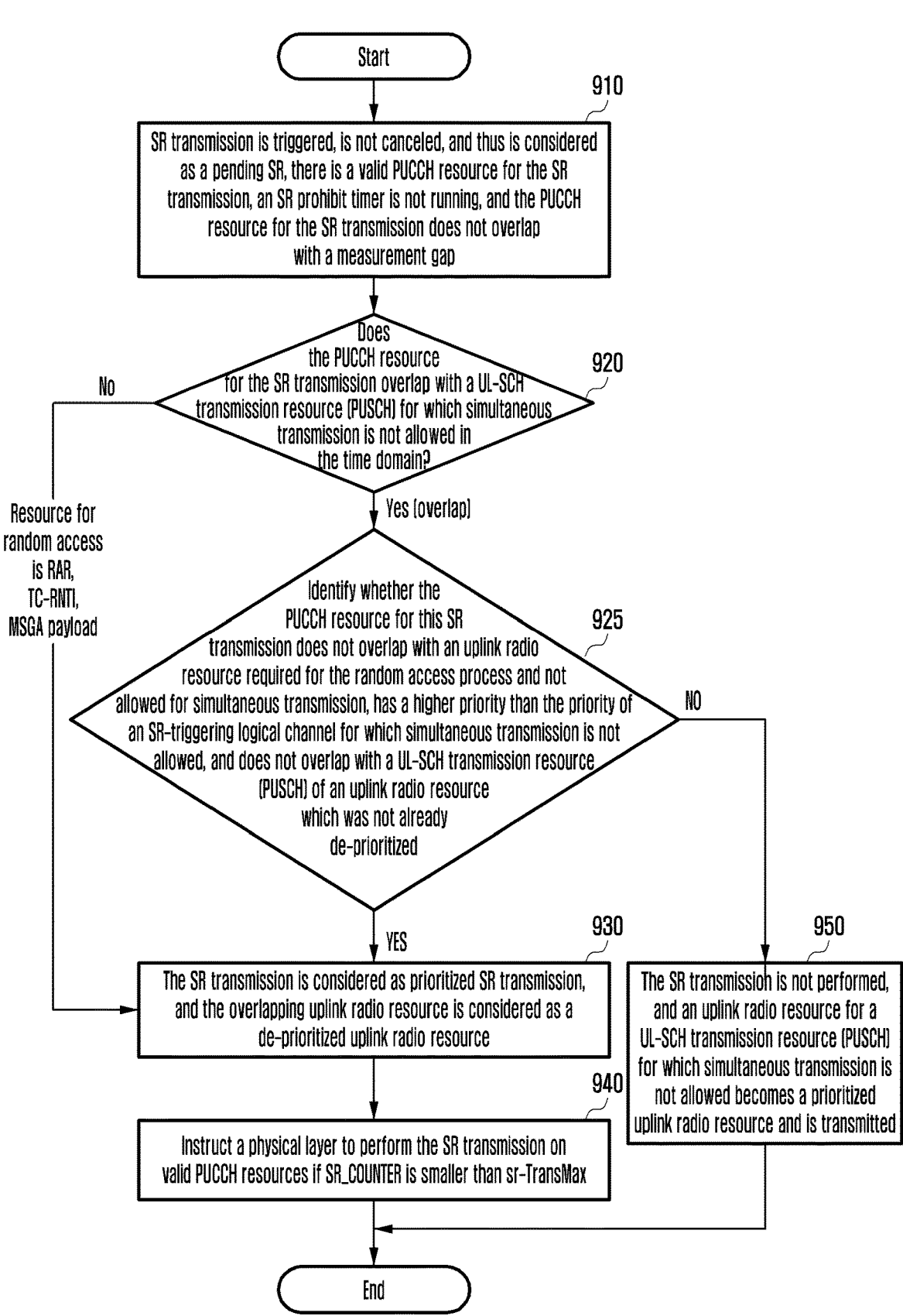
FIG. 9 is a diagram illustrating an SR triggering operation considering a PUCCH-PUSCH simultaneous transmission condition according to an embodiment of the disclosure.

FIG. 9 is a diagram illustrating an SR triggering operation considering a PUCCH-PUSCH simultaneous transmission condition according to an embodiment of the disclosure.

The embodiment of FIG. 9 indicates an operation of considering whether there is a UL-SCH resource using a PUSCH resource not allowed for simultaneous transmission upon SR transmission using the PUCCH resource, and also considering the priorities of such resources, in the case where a logical channel (LCH)-based prioritization opera- tion is configured.

For example, it is assumed at step 910 that the SR transmission is triggered, is not canceled, and thus is con- sidered as a pending SR, there is a valid PUCCH resource for the SR transmission, an SR prohibit timer is not running, and the PUCCH resource for the SR transmission does not overlap with a measurement gap. If this condition is satis- fied, there is a possibility of performing the SR transmission, and an operation of identifying whether the SR transmission can be transmitted may be required. In this case, at step 920, it may be identified whether the PUCCH resource for the SR transmission overlaps with the UL-SCH resource for which simultaneous transmission (i.e., PUSCH resource) is not allowed in the time domain. At the step 920, an operation of identifying the allocation state of the UL-SCH resource not allowed for simultaneous transmission is required, and an operation of identifying the allocation state of the UL-SCH resource enabling simultaneous transmission may not be required. For example, an operation allowed for simultane- ous transmission using the PUCCH resource for transmitting SR and the UL-SCH resource (PUSCH) resource may be enabled when there are different PHY priorities within the same PUCCH group. In another embodiment, an operation allowed for simultaneous transmission may be enabled in the case of a cell of the PUSCH resource configured to be allowed simultaneous transmission with a cell of the PUCCH resource. Alternatively, an operation allowed for simultaneous transmission may be enabled in the case where transmit power for transmission of the PUCCH resource and transmission of the PUSCH resource is sufficient.

If the PUCCH resource for the SR transmission overlaps with the UL-SCH transmission resource for which simulta- neous transmission is not allowed in the time domain at the step 920, it may be identified at step 925 whether the PUCCH resource for this SR transmission does not overlap with an uplink radio resource required for the random access process and not allowed for simultaneous transmission, has a higher priority than the priority of an SR-triggering logical channel not allowed for simultaneous transmission, and does not overlap with a UL-SCH transmission resource (PUSCH) of an uplink radio resource that was not already de-priori- tized. At the step 925, the uplink radio resource required for the random access process may be one of a resource allo- cated in a random access response (RAR) message, a resource allocated by a temporary cell-radio network tem- porary identity (temporary C-RNTI), or a message A (MSGA) payload.

If the condition of step 925 is satisfied, the SR transmis- sion may be considered as prioritized SR transmission at step 930. In addition, if SR COUNTER is smaller than sr-TransMax, instruct the physical layer to perform the SR transmission on valid PUCCH resources at step 940. If the condition is not satisfied at the step 925, the SR transmission using a PUCCH resource cannot be performed. Therefore, this SR transmission is not performed. Further, an uplink radio resource for a UL-SCH transmission resource (PUSCH) not allowed for simultaneous transmission may be prioritized and transmitted at step 950.

If the PUCCH resource for the SR transmission does not overlap with the UL-SCH transmission resource for which simultaneous transmission is not allowed in the time domain at the step 920, the SR transmission using this PUCCH resource can be performed. Therefore, at step 930, the SR transmission may be considered as prioritized SR transmis- sion. In addition, if SR COUNTER is smaller than sr- TransMax, instruct the physical layer to perform the SR transmission on valid PUCCH resources at step 940. At the steps 920 and 925 of the embodiment of FIG. 9, an uplink radio resource (UL-SCH, PUSCH) enabling simultaneous transmission with the SR transmission is not identified whether it overlaps with the SR transmission in the time domain, and its priority is not compared. In other words, it may be excluded from comparison.

Figure 10:
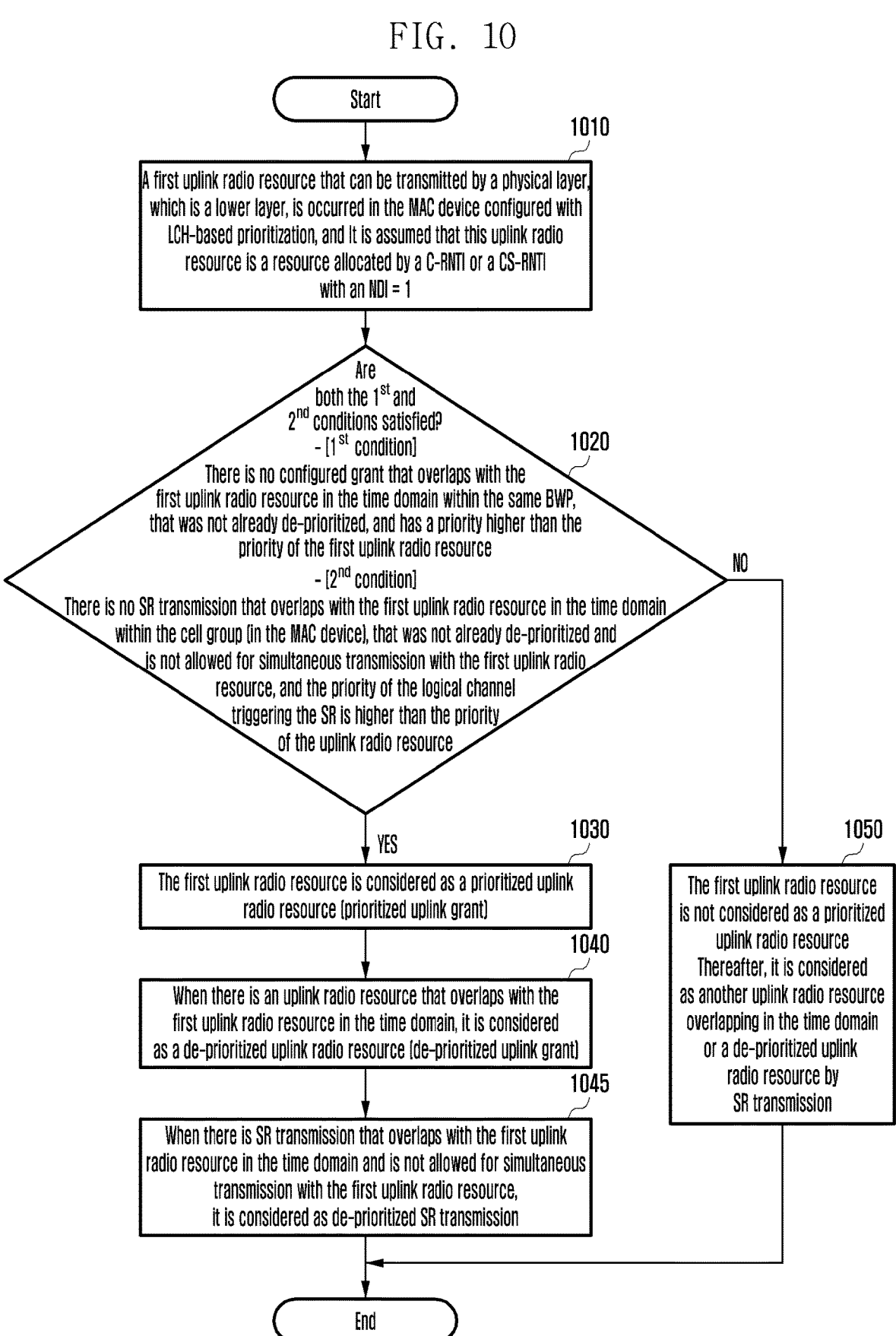
FIG. 10 is a diagram illustrating a transmission operation of uplink radio resources considering a PUCCH-PUSCH simultaneous transmission condition according to an embodiment of the disclosure.

FIG. 10 is a diagram illustrating a transmission operation of uplink radio resources considering a PUCCH-PUSCH simultaneous transmission condition according to an embodiment of the disclosure.

The embodiment of FIG. 10 indicates, when UL-SCH resource transmission using a PUCCH resource is performed in the case where a logical channel (LCH)-based prioritiza- tion operation is configured, an operation of considering whether there are SR transmission using other PUSCH transmission resource in the same cell, and SR transmission using a PUCCH resource in the MAC device, and also considering the priorities of such resources. At step 1010, a first uplink radio resource that can be transmitted in a physical layer, which is a lower layer, is occurred in the MAC device with which LCH-based prioritization is con- figured. Also, it is assumed that this uplink radio resource is a resource allocated by a C-RNTI or a configured scheduling (CS)-RNTI with a new data indicator (NDI) of 1. In this case, in order to transmit this uplink radio resource, it may be identified at step 1020 whether both of the following two conditions are satisfied.

[First Condition]

There is no configured grant that overlaps with the first uplink radio resource in the time domain within the same BWP, was not already de-prioritized, and has a priority higher than the priority of the first uplink radio resource.

[Second Condition]

There is no SR transmission that overlaps with the first uplink radio resource in the time domain within the cell group (in the MAC device), was not already de-prioritized, and is not allowed for simultaneous transmission with the first uplink radio resource, and the priority of the logical channel triggering the SR is higher than the priority of the first uplink radio resource.

When both the first and second conditions are satisfied at the step 1020, this uplink radio resource may be considered as a prioritized uplink radio resource at step 1030. Transmission of this prioritized uplink radio resource can be performed by a physical layer instructed to transmit. In addition, when there is an uplink radio resource that overlaps with the first uplink radio resource in the time domain within the BWP, it may be considered as a de-prioritized uplink radio resource (de-prioritized uplink grant) at step 1040. When there is SR transmission that overlaps with the first uplink radio resource in the time domain and is not allowed for simultaneous transmission with the first uplink radio resource, this SR transmission may be considered as de-prioritized SR transmission at step 1045. If both the first and second conditions are not satisfied at the step 1020, the first uplink radio resource cannot be considered as a prioritized uplink radio resource. In one embodiment, the first uplink radio resource may be a de-prioritized uplink radio resource. Thereafter, at step 1050, it may be considered as another uplink radio resource overlapping in the time domain or a de-prioritized uplink radio resource by SR transmission.

Figure 11:
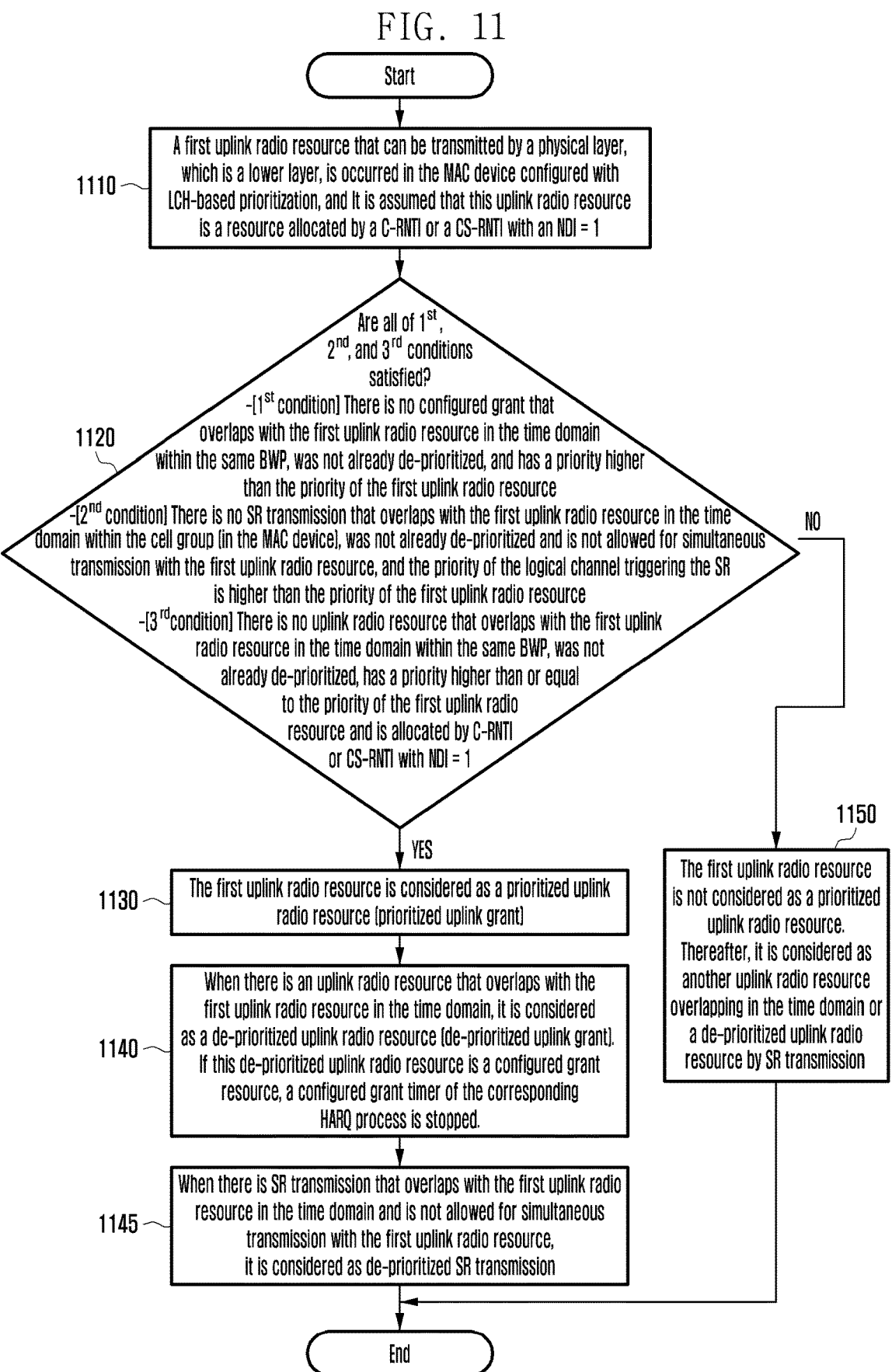
FIG. 11 is a diagram illustrating a transmission operation of uplink radio resources considering a PUCCH-PUSCH simultaneous transmission condition according to an embodiment of the disclosure.

FIG. 11 is a diagram illustrating a transmission operation of uplink radio resources considering a PUCCH-PUSCH simultaneous transmission condition according to an embodiment of the disclosure.

The embodiment of FIG. 11 indicates, when UL-SCH resource transmission using a PUCCH resource is performed in the case where a logical channel (LCH)-based prioritization operation is configured, an operation of considering whether there are SR transmission using other PUSCH transmission resource in the same cell and SR transmission using a PUCCH resource in the MAC device, and also considering the priorities of such resources. At step 1110, a first uplink radio resource that can be transmitted in a physical layer, which is a lower layer, is occurred in the MAC device with which LCH-based prioritization is configured. Also, it is assumed that this uplink radio resource is a configured grant resource. The configured grant resource may include a resource allocated by a configured scheduling (CS)-RNTI indicating activation of configured grant with a new data indicator (NDI) of 0. In this case, in order to transmit this uplink radio resource, it may be identified at step 1120 whether all of the following three conditions are satisfied.

[First Condition]

There is no configured grant that overlaps with the first uplink radio resource in the time domain within the same BWP, was not already de-prioritized, and has a priority higher than the priority of the first uplink radio resource.

[Second Condition]

There is no SR transmission that overlaps with the first uplink radio resource in the time domain within the cell group (in the MAC device), was not already de-prioritized, and not allowed for simultaneous transmission with the first uplink radio resource, and the priority of the logical channel triggering the SR is higher than the priority of the first uplink radio resource.

[Third Condition]

There is no uplink radio resource that overlaps with the first uplink radio resource in the time domain within the same BWP, was not already de-prioritized, has a priority higher than or equal to the priority of the first uplink radio resource and is allocated by C-RNTI or CS-RNTI with NDI of 1.

When all of the first, second and third conditions are satisfied at the step 1120, this uplink radio resource may be considered as a prioritized uplink radio resource at step 1130. Transmission of this prioritized uplink radio resource can be performed by a physical layer instructed to transmit. In addition, when there is an uplink radio resource that overlaps with the first uplink radio resource in the time domain within the BWP, it may be considered as a de-prioritized uplink radio resource (de-prioritized uplink grant) at step 1140. If this de-prioritized uplink radio resource is a configured grant resource, the operation of a configured grant timer of the corresponding HARQ process may be stopped. When there is SR transmission that overlaps with the first uplink radio resource in the time domain and is not allowed for simultaneous transmission with the first uplink radio resource, this SR transmission may be considered as de-prioritized SR transmission at step 1145. If all of the first, second and third conditions are not satisfied at the step 1120, the first uplink radio resource cannot be considered as a prioritized uplink radio resource. In one embodiment, the first uplink radio resource may be a de-prioritized uplink radio resource. Thereafter, at step 1150, it may be considered as another uplink radio resource overlapping in the time domain or a de-prioritized uplink radio resource by SR transmission.

Figure 12:
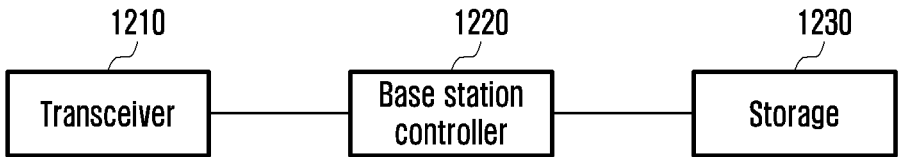
FIG. 12 is a diagram illustrating the structure of a base station according to an embodiment of the disclosure.

FIG. 12 is a diagram illustrating the structure of a base station according to an embodiment of the disclosure.

With reference to FIG. 12, the base station may include a transceiver 1210, a controller 1220, and a storage 1230. In the disclosure, the controller 1220 may be defined as a circuit, an application-specific integrated circuit, or at least one processor. The transceiver 1210 may transmit and receive signals to and from other network entities. For example, the transceiver 1210 may transmit system information to a UE and may transmit a synchronization signal or a reference signal. The controller 1220 may control overall operations of the base station according to the embodiment proposed by the disclosure. For example, the controller 1220 may control a signal flow between blocks to perform the above-described operation of the flowchart. The storage 1230 may store at least one of information transmitted and received through the transceiver 1210 and information generated through the controller 1220.

Figure 13:
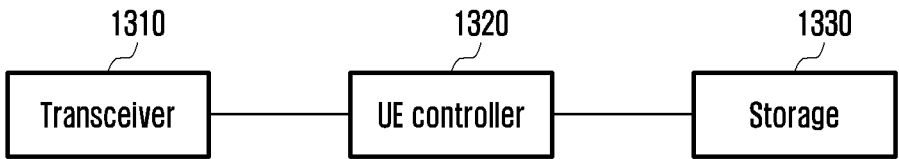
FIG. 13 is a diagram illustrating the structure of a UE according to an embodiment of the disclosure.

FIG. 13 is a diagram illustrating the structure of a UE according to an embodiment of the disclosure.

With reference to FIG. 13, the UE may include a transceiver 1310, a controller 1320, and a storage 1330. In the disclosure, the controller may be defined as a circuit, an application-specific integrated circuit, or at least one processor. The transceiver 1310 may transmit and receive signals to and from other network entities. For example, the transceiver 1310 may receive system information from a base station and may receive a synchronization signal or a reference signal. The controller 1320 may control overall operations of the UE according to the embodiment proposed by the disclosure. For example, the controller 1320 may control a signal flow between blocks to perform the above-described operation of the flowchart. The storage 1330 may store at least one of information transmitted and received through the transceiver 1310 and information generated through the controller 1320.

Although specific embodiments have been described in the detailed description of the disclosure, various modifications are possible without departing from the scope of the disclosure. Therefore, the scope of the disclosure should not be limited to the described embodiments and should be defined by claims set forth below as well as equivalents to claims.

The invention claimed is:

1. A method performed by a terminal in a wireless communication system, the method comprising:

identifying a first uplink resource associated with data to be transmitted by a lower layer of a medium access control (MAC) entity configured with a logical channel (LCH)-based prioritization operation;

identifying whether the first uplink resource does not overlap with a second uplink resource associated with a logical channel having a priority higher than a priority of the first uplink resource, wherein the second uplink resource has not been de-prioritized;

identifying whether a simultaneous transmission of the first uplink resource and the second uplink resource is not allowed by a configuration; and in case that the first uplink resource does not overlap with the second uplink resource and the simultaneous transmission of the first uplink resource and the second uplink resource is not allowed by the configuration, identifying the first uplink resource as a prioritized uplink resource, wherein the configuration is associated with a simultaneous physical uplink shared channel (PUSCH) and physical uplink control channel (PUCCH) transmission with different priorities.

2. The method of claim 1, wherein the first uplink resource includes a dynamic uplink resource allocated by a cell-radio network temporary identity (C-RNTI) or a configured scheduling (CS)-RNTI with a new data indicator (NDI) of 1, or a configured uplink resource, and wherein the second uplink resource includes a PUCCH resource for a scheduling request (SR) transmission.

3. The method of claim 2, wherein the SR transmission is triggered by the logical channel.

4. The method of claim 2, further comprising:

identifying another SR transmission overlapped with the first uplink resource as a de-prioritized SR transmission, wherein the de-prioritized SR transmission does not include at least one SR transmission allowed for the simultaneous PUSCH and PUCCH transmission by the configuration.

5. The method of claim 1, further comprising:

identifying whether a PUCCH resource for a scheduling request (SR) transmission does not overlap with an uplink-shared channel (UL-SCH) resource, wherein the UL-SCH resource has not been de-prioritized, and a priority of a logical channel that triggered the SR transmission is higher than a priority of the UL-SCH resource;

identifying whether a simultaneous transmission of the PUCCH resource and the UL-SCH resource is not allowed by the configuration; and in case that the PUCCH resource does not overlap with the UL-SCH resource and the simultaneous transmission of the PUCCH resource and the UL-SCH resource is not allowed by the configuration, identifying the PUCCH resource as the prioritized uplink resource, wherein the UL-SCH resource is one of an uplink resource allocated in a random access response message, an uplink resource allocated by a temporary C-RNTI, or a payload of a message A (MSGA).

6. The method of claim 1, further comprising:

instructing, at the MAC entity to the lower layer, to trigger a transmission based on the first uplink resource.

7. A terminal in a wireless communication system, 8. the terminal comprising:

a transceiver; and a controller configured to:

identify a first uplink resource associated with data to be transmitted by a lower layer of a medium access control (MAC) entity configured with a logical channel (LCH)-based prioritization operation, identify whether the first uplink resource does not overlap with a second uplink resource associated with a logical channel having which has-a priority higher than a priority of the first uplink resource, wherein the second uplink resource has not been de-prioritized, identify whether a simultaneous transmission of the first uplink resource and the second uplink resource is not allowed by a configuration, and in case that the first uplink resource does not overlap with the second uplink resource and the simultaneous transmission of the first uplink resource and the second uplink resource is not allowed by the configuration, identify the first uplink resource as a prioritized uplink resource, wherein the configuration is associated with a simultaneous physical uplink shared channel (PUSCH) and physical uplink control channel (PUCCH) transmission with different priorities.

8. The terminal of claim 7, wherein the first uplink resource includes a dynamic uplink resource allocated by a cell-radio network temporary identity (C-RNTI) or a configured scheduling (CS)-RNTI with a new data indicator (NDI) of 1, or a configured uplink resource, and wherein the second uplink resource includes a PUCCH resource for a scheduling request (SR) transmission.

9. The terminal of claim 8, wherein the SR transmission is triggered by the logical channel.

10. The terminal of claim 8, wherein the controller is further configured to identify another SR transmission overlapped with the first uplink resource as a de-prioritized SR transmission, and wherein the de-prioritized SR transmission does not include at least one SR transmission allowed for the simultaneous PUSCH and PUCCH transmission by the configuration.

11. The terminal of claim 7, wherein the controller is further configured to:

identify whether a PUCCH resource for a scheduling request (SR) transmission does not overlap with an uplink-shared channel (UL-SCH) resource, wherein the UL-SCH resource has not been de-prioritized, and a priority of a logical channel that triggered the SR transmission is higher than a priority of the UL-SCH resource;

identify whether a simultaneous transmission of the PUCCH resource and the UL-SCH resource is not allowed by the configuration; and in case that the PUCCH resource does not overlap with the UL-SCH resource and the simultaneous transmission of the PUCCH resource and the UL- SCH resource is not allowed by the configuration, identify the PUCCH resource as the prioritized uplink resource, and wherein the UL-SCH resource is one of an uplink resource allocated in a random access response message, an uplink resource allocated by a temporary C-RNTI, or a payload of a message A (MSGA).

12. The terminal of claim 7, wherein the controller is further configured to instruct, at the MAC entity, to the lower layer, to trigger a transmission based on the first uplink resource.

\* \* \* \* \*